(12) United States Patent
He et al.

(10) Patent No.: US 9,843,904 B2
(45) Date of Patent: Dec. 12, 2017

(54) METHOD AND APPARATUS FOR ESTABLISHING INDOOR LOCATION FEATURE LIBRARY

(71) Applicant: Huawei Technologies Co., Ltd., Shenzhen (CN)

(72) Inventors: Yang He, Shanghai (CN); Yingzhe Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/246,131

(22) Filed: Aug. 24, 2016

(65) Prior Publication Data

US 2017/0013418 A1    Jan. 12, 2017

Related U.S. Application Data

(63) Continuation of application No. PCT/CN2014/072497, filed on Feb. 25, 2014.

(51) Int. Cl.
*H04W 4/04* (2009.01)
*G01C 21/20* (2006.01)
(Continued)

(52) U.S. Cl.
CPC .......... *H04W 4/043* (2013.01); *G01C 21/206* (2013.01); *G01S 5/02* (2013.01); *G01S 5/0252* (2013.01); *H04B 17/318* (2015.01); *H04W 4/02* (2013.01); *H04W 8/24* (2013.01); *H04W 64/003* (2013.01); *H04W 64/006* (2013.01); *H04B 17/26* (2015.01); *H04B 17/27* (2015.01)

(58) Field of Classification Search
CPC ....... G01C 21/206; G01S 5/02; G01S 5/0252; H04B 17/318; H04W 4/02; H04W 4/043; H04W 64/003; H04W 64/006; H04W 8/24

See application file for complete search history.

(56) References Cited

U.S. PATENT DOCUMENTS

| | | | | |
|---|---|---|---|---|
| 2013/0023286 A1* | 1/2013 | Soma | ....................... | H04W 4/02 455/456.1 |
| 2013/0039194 A1* | 2/2013 | Siomina | .............. | H04W 52/244 370/252 |

FOREIGN PATENT DOCUMENTS

| | | |
|---|---|---|
| CN | 101114019 A | 1/2008 |
| CN | 102595592 A | 7/2012 |
| CN | 102854491 A | 1/2013 |

* cited by examiner

*Primary Examiner* — Kashif Siddiqui
(74) *Attorney, Agent, or Firm* — Leydig, Voit & Mayer, Ltd.

(57) ABSTRACT

Embodiments of the present invention relate to a method and an apparatus for establishing an indoor location feature library. A sever selects, by using identification information of first user equipments (UEs) that is included in received first measurement data, multiple pieces of the first measurement data that have identification information of a same first UE; when the first UE is located indoors, obtaining location information of multiple of first access nodes according to feature attribute information of the multiple of the first access nodes; determining, according to the location information of the multiple of the first access nodes and the feature attribute information of the multiple of the first access nodes, indoor location information of the first UE; and establishing an indoor location feature library by using cell identification information and signal power values of multiple cells and indoor location information of the first UE.

10 Claims, 4 Drawing Sheets

(51) Int. Cl.
*G01S 5/02* (2010.01)
*H04W 64/00* (2009.01)
*H04W 8/24* (2009.01)
*H04W 4/02* (2009.01)
*H04B 17/318* (2015.01)
*H04B 17/26* (2015.01)
*H04B 17/27* (2015.01)

METHOD AND APPARATUS FOR ESTABLISHING INDOOR LOCATION FEATURE LIBRARY

CROSS-REFERENCE TO RELATED APPLICATIONS

This application is a continuation of International Application No. PCT/CN2014/072497, filed on Feb. 25, 2014, which is hereby incorporated by reference in its entirety.

TECHNICAL FIELD

Embodiments of the present invention relates to the field of communications technologies, and in particular, to a method and an apparatus for establishing an indoor location feature library.

BACKGROUND

Currently, with rapid development and popularity of communications systems, an indoor/outdoor location of user equipment (UE for short) is important information for both a network side and a terminal.

In an architecture based on the 3rd Generation partnership project (3GPP for short), a network side obtains location information of a UE by using a Radio Frequency (RF for short) fingerprint location technology.

A specific process of the RF fingerprint location technology is: A fingerprint library (or a location feature library) is first constructed for an area to be identified. The fingerprint library records an RF signal feature (for example, the RF signal feature is a value of a strength value of a signal received by the UE from a nearby base station) in each minimum unit location area. Next, when the network side performs location, if an RF signal feature reported by a UE at an unknown location matches an RF signal feature in a minimum unit location area in the fingerprint library (matching refers to that if an error between the RF signal feature reported by the UE at the unknown location and the RF signal feature in the minimum unit location area falls within a preset range, the two RF signal features match), the network side deduces that the UE at the unknown location is located within the minimum unit location area, thereby achieving a purpose of locating the UE.

However, in the prior art, location of a UE by using an RF fingerprint location technology also has the following disadvantage: The RF fingerprint location technology needs to use a location feature library as a priori knowledge. In application of an existing network, an outdoor UE having a GNSS function performs accurate location measurement in advance, and constructs an outdoor location feature library, to accumulate a priori knowledge for subsequent location work. However, because the GNSS function cannot perform accurate location measurement indoors and the network side generally determines a location of the UE indoors by using only a handover of the UE between cells (for example, a case in which the UE camps on a cell, a case of a handover of the UE between cells, and a moving speed of the UE), it is extremely difficult for the existing RF fingerprint location technology to construct an indoor location feature library. In addition, the constructed indoor location feature library has low location precision and an undesirable indoor location effect.

SUMMARY

Embodiments of the present invention provide a method and an apparatus for establishing an indoor location feature library. Indoor location information of user equipment is determined according to location information of multiple access nodes in which the user equipment is located, and an indoor location feature library is established and improve location precision and a location effect of the indoor location feature library are improved.

According to a first aspect, an embodiment of the present invention provides a method for establishing an indoor location feature library, where the method includes:

receiving multiple pieces of first measurement data sent by multiple first user equipments, where the first measurement data includes identification information of the first user equipment, cell identification information and signal power values, measured by the first user equipment, of multiple cells, and feature attribute information of multiple first access nodes that is measured by the first user equipment;

selecting, by using the identification information of the first user equipments, multiple pieces of the first measurement data that have identification information of a same first user equipment;

when the first user equipment is located indoors, obtaining location information of multiple of the first access nodes according to feature attribute information of the multiple of the first access nodes that is included in the selected multiple pieces of the first measurement data;

determining, according to the location information of the multiple of the first access nodes and the feature attribute information of the multiple of the first access nodes, indoor location information of the first user equipment when the first user equipment obtains the first measurement data; and establishing an indoor location feature library by using multiple pieces of the cell identification information and multiple of the signal power values and the indoor location information of the first user equipment.

In a first possible implementation manner, before the receiving multiple pieces of first measurement data sent by multiple first user equipments, the method further includes:

receiving multiple pieces of second measurement data sent by multiple second user equipments, where the second measurement data includes location information of the second user equipment when the second user equipment obtains the second measurement data and feature attribute information of multiple second access nodes that is measured by the second user equipment, and the feature attribute information of the second access node includes identification information of the second access node and a signal power value, measured by the second user equipment, of the second access node;

selecting multiple pieces of the second measurement data that have identification information of a same second access node;

determining location information of multiple of the second access nodes according to location information of multiple of the second user equipments and signal power values of the multiple of the second access nodes; and storing the determined location information of the multiple of the second access nodes.

With reference to the first possible implementation manner of the first aspect, in a second possible implementation manner, the feature attribute information of the first access node includes identification information of the first access node; and the obtaining location information of multiple of the first access nodes according to feature attribute information of the multiple of the first access nodes that is included in the selected multiple pieces of the first measurement data specifically includes:

searching for, according to identification information of the multiple of the first access nodes, location information, which matches the identification information of the multiple of the first access nodes, of the multiple of the second access nodes; and using the found location information of the multiple of the second access nodes as the location information of the multiple of the first access nodes.

With reference to the second possible implementation manner of the first aspect, in a third possible implementation manner, the feature attribute information of the first access node further includes a signal power value, measured by the first user equipment, of the first access node; and the determining, according to the location information of the multiple of the first access nodes and the feature attribute information of the multiple of the first access nodes, indoor location information of the first user equipment when the first user equipment obtains the first measurement data specifically includes:

determining, according to the location information of the multiple of the first access nodes and signal power values of the multiple of the first access nodes, the indoor location information of the first user equipment when the first user equipment obtains the first measurement data.

In a fourth possible implementation manner, after the establishing an indoor location feature library by using multiple pieces of the cell identification information and multiple of the signal power values and the indoor location information of the first user equipment, the method further includes:

receiving third measurement data sent by third user equipment, where the third measurement data includes identification information of the third user equipment and cell identification information and signal power values, measured by the third user equipment, of multiple cells;

determining, by using the identification information of the third user equipment, whether the third user equipment is located indoors when the third user equipment obtains the third measurement data;

if the third user equipment is located indoors, determining an indoor location of the third user equipment according to the indoor location feature library and multiple pieces of the cell identification information and multiple of the signal power values; and if the third user equipment is located outdoors, determining an outdoor location of the third user equipment according to an outdoor location feature library and multiple pieces of the cell identification information and multiple of the signal power values.

According to a second aspect, an embodiment of the present invention provides an apparatus for establishing an indoor location feature library, where the apparatus includes:

a receiving unit, configured to receive multiple pieces of first measurement data sent by multiple first user equipments, where the first measurement data includes identification information of the first user equipment, cell identification information and signal power values, measured by the first user equipment, of multiple cells, and feature attribute information of multiple first access nodes that is measured by the first user equipment;

a selection unit, configured to select, by using the identification information of the first user equipments, multiple pieces of the first measurement data that have identification information of a same first user equipment;

an obtaining unit, configured to: when the first user equipment is located indoors, obtain location information of multiple of the first access nodes according to feature attribute information of the multiple of the first access nodes that is included in the selected multiple pieces of the first measurement data;

a determining unit, configured to determine, according to the location information of the multiple of the first access nodes and the feature attribute information of the multiple of the first access nodes, indoor location information of the first user equipment when the first user equipment obtains the first measurement data; and an establishment unit, configured to establish an indoor location feature library by using multiple pieces of the cell identification information and multiple of the signal power values and the indoor location information of the first user equipment.

In a first possible implementation manner, the receiving unit is further configured to:

receive multiple pieces of second measurement data sent by multiple second user equipments, where the second measurement data includes location information of the second user equipment when the second user equipment obtains the second measurement data and feature attribute information of multiple second access nodes that is measured by the second user equipment, and the feature attribute information of the second access node includes identification information of the second access node and a signal power value, measured by the second user equipment, of the second access node;

the selection unit is further configured to select multiple pieces of the second measurement data that have identification information of a same second access node; and the determining unit is further configured to determine location information of multiple of the second access nodes according to location information of multiple of the second user equipments and signal power values of the multiple of the second access nodes; and the apparatus further includes a storage unit, configured to store the determined location information of the multiple of the second access nodes.

With reference to the first possible implementation manner of the second aspect, in a second possible implementation manner, the feature attribute information of the first access node that is received by the receiving unit includes identification information of the first access node; and the obtaining unit is specifically configured to search for, according to identification information of the multiple of the first access nodes, location information, which matches the identification information of the multiple of the first access nodes, of the multiple of the second access nodes; and use the found location information of the multiple of the second access nodes as the location information of the multiple of the first access nodes.

With reference to the second possible implementation manner of the second aspect, in a third possible implementation manner, the feature attribute information of the first access node that is received by the receiving unit further includes a signal power value, measured by the first user equipment, of the first access node; and the determining unit is specifically configured to determine, according to the location information of the multiple of the first access nodes and signal power values of the multiple of the first access nodes, the indoor location information of the first user equipment when the first user equipment obtains the first measurement data.

In a fourth possible implementation manner, the receiving unit is further configured to:

receive third measurement data sent by third user equipment, where the third measurement data includes identification information of the third user equipment and cell identification information and signal power values, measured by the third user equipment, of multiple cells; and the apparatus further includes: a judging unit, configured to determine, by using the identification information of the third user equipment, whether the third user equipment is located indoors when the third user equipment obtains the third measurement data; and the determining unit is further configured to: if the third user equipment is located indoors, determine an indoor location of the third user equipment according to the indoor location feature library and multiple pieces of the cell identification information and multiple of the signal power values; and the determining unit is further configured to: if the third user equipment is located outdoors, determine an outdoor location of the third user equipment according to an outdoor location feature library and multiple pieces of the cell identification information and multiple of the signal power values.

In a third aspect, an embodiment of the present invention provides an apparatus for establishing an indoor location feature library, the apparatus includes:

a network interface;

a processor; and a storage, where an application program is physically stored in the storage, where the application includes an instruction that can be used to enable the processor to execute the following processes:

receiving multiple pieces of first measurement data sent by multiple first user equipments, where the first measurement data includes identification information of the first user equipment, cell identification information and signal power values, measured by the first user equipment, of multiple cells, and feature attribute information of multiple first access nodes that is measured by the first user equipment;

selecting, by using the identification information of the first user equipments, multiple pieces of the first measurement data that have identification information of a same first user equipment;

when the first user equipment is located indoors, obtaining location information of multiple of the first access nodes according to feature attribute information of the multiple of the first access nodes that is included in the selected multiple pieces of the first measurement data;

determining, according to the location information of the multiple of the first access nodes and the feature attribute information of the multiple of the first access nodes, indoor location information of the first user equipment when the first user equipment obtains the first measurement data; and establishing an indoor location feature library by using multiple pieces of the cell identification information and multiple of the signal power values and the indoor location information of the first user equipment.

In a first possible implementation manner, the application further includes an instruction that can be used to enable the processor to execute the following processes:

receiving multiple pieces of second measurement data sent by multiple second user equipments, where the second measurement data includes location information of the second user equipment when the second user equipment obtains the second measurement data and feature attribute information of multiple second access nodes that is measured by the second user equipment, and the feature attribute information of the second access node includes identification information of the second access node and a signal power value, measured by the second user equipment, of the second access node;

selecting multiple pieces of the second measurement data that have identification information of a same second access node;

determining location information of multiple of the second access nodes according to location information of multiple of the second user equipments and signal power values of the multiple of the second access nodes; and storing the determined location information of the multiple of the second access nodes.

With reference to the first possible implementation manner of the third aspect, in a second possible implementation manner, the feature attribute information of the first access node includes identification information of the first access node; and an instruction, which can be used to enable the processor to execute the process of obtaining location information of multiple of the first access nodes according to feature attribute information of the multiple of the first access nodes that is included in the selected multiple pieces of the first measurement data, of the application program is:

searching for, according to identification information of the multiple of the first access nodes, location information, which matches the identification information of the multiple of the first access nodes, of the multiple of the second access nodes; and using the found location information of the multiple of the second access nodes as the location information of the multiple of the first access nodes.

With reference to the second possible implementation manner of the third aspect, in a third possible implementation manner, the feature attribute information of the first access node further includes a signal power value, measured by the first user equipment, of the first access node; and an instruction, which can be used to enable the processor to execute the process of determining, according to the location information of the multiple of the first access nodes and the feature attribute information of the multiple of the first access nodes, indoor location information of the first user equipment when the first user equipment obtains the first measurement data, of the application program is:

determining, according to the location information of the multiple of the first access nodes and signal power values of the multiple of the first access nodes, the indoor location information of the first user equipment when the first user equipment obtains the first measurement data.

In a fourth possible implementation manner, the application program further includes an instruction that can be used to enable the processor to execute the following processes:

receiving third measurement data sent by third user equipment, where the third measurement data includes identification information of the third user equipment and cell identification information and signal power values, measured by the third user equipment, of multiple cells;

determining, by using the identification information of the third user equipment, whether the third user equipment is located indoors when the third user equipment obtains the third measurement data;

if the third user equipment is located indoors, determining an indoor location of the third user equipment according to the indoor location feature library and multiple pieces of the cell identification information and multiple of the signal power values; and if the third user equipment is located outdoors, determining an outdoor location of the third user equipment according to an outdoor location feature library and multiple pieces of the cell identification information and multiple of the signal power values.

Therefore, according to the method and apparatus for establishing an indoor location feature library provided in embodiments of the present invention, a server selects multiple pieces of first measurement data, which have identification information of a same first user equipment, from received multiple pieces of first measurement data; when the first user equipment is located indoors, obtains, by using the selected multiple pieces of the first measurement data, location information of multiple first access nodes in which the first user equipment is located; and determines indoor location information of the first user equipment according to the location information of the multiple first access nodes, and establishes an indoor location feature library. The method and apparatus resolve prior-art problems of great difficulty in constructing an indoor location feature library in an existing RF fingerprint location technology as well as low location precision and an undesirable indoor location effect of the constructed indoor location feature library because a GNSS function cannot perform accurate location measurement indoors and a network side generally determines an indoor location of a UE by using only a handover of the UE between cells; and establish an indoor location feature library by the server according to measurement data, and improve precision of establishing an indoor location feature library. In addition, during subsequent location, the server selectively uses outdoor and indoor location feature libraries according to measurement data sent by user equipment, which also improves a location effect for an entire area.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To provide thorough understanding of the present invention, the following further describes the embodiments of the present invention in detail with reference to the accompanying drawings. The foregoing embodiments are not intended to limit the protection scope of the present invention.

Embodiment 1

Figure 1:
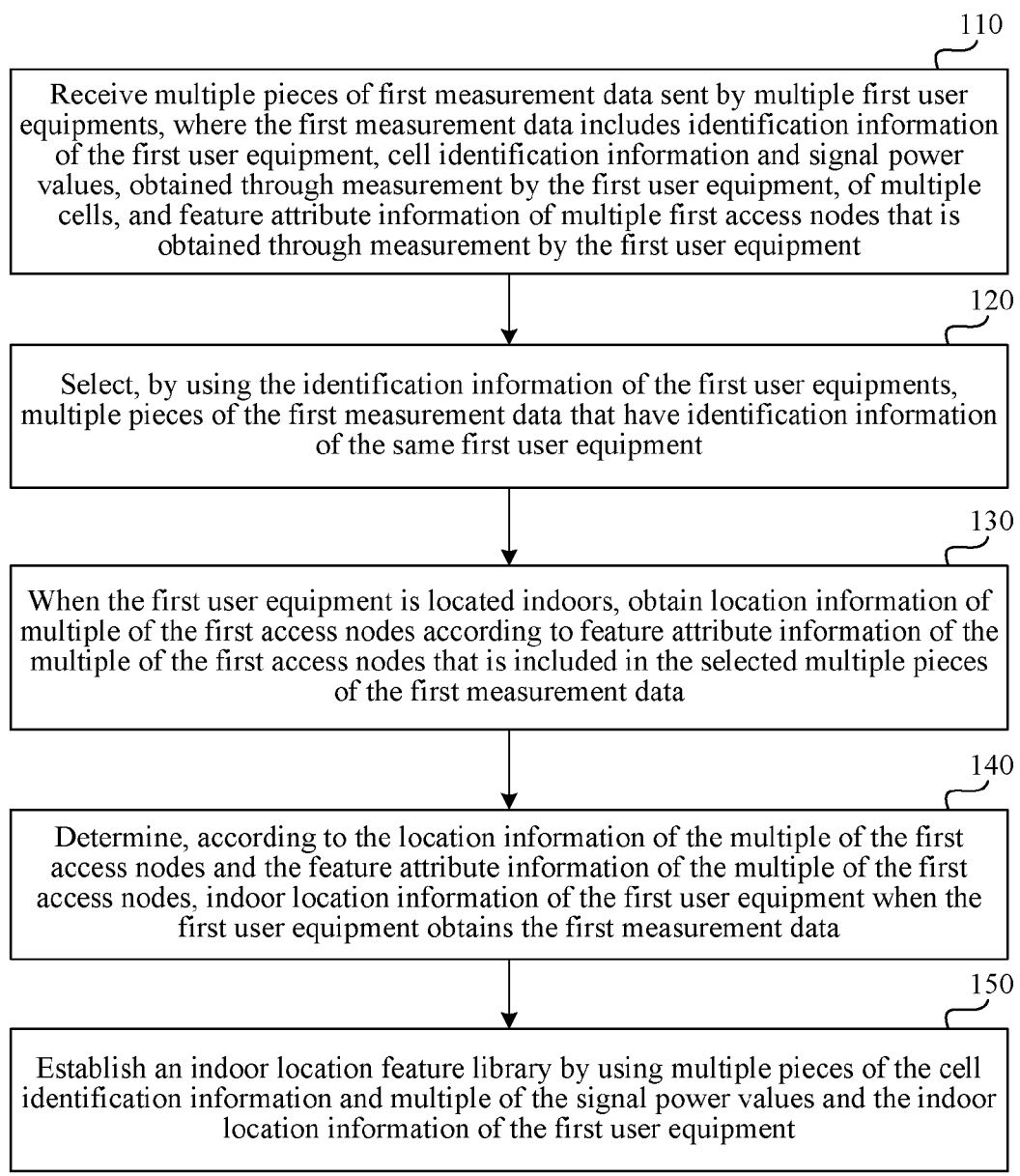
FIG. 1 is a flowchart of a method for establishing an indoor location feature library according to Embodiment 1 of the present invention.

The following describes a method for establishing an indoor location feature library provided in Embodiment 1 of the present invention in detail by using FIG. 1 as an example. FIG. 1 is a flowchart of a method for establishing an indoor location feature library according to Embodiment 1 of the present invention. In this embodiment of the present invention, an implementation body is a server on a network side. The server may be a server (for example, a trace data collection entity (TCE for short)) of a network management system, a base station, or a core network device. When the server is a server of a network management system, the server may perform data transmission with a user equipment by means of forwarding of a base station. When the server is a base station, the server may perform data transmission with user equipment by using an air interface. When the server is a core network device, the server may perform data transmission with user equipment by means of forwarding of a base station. As shown in FIG. 1, this embodiment specifically includes the following steps:

Step 110: Receive multiple pieces of first measurement data sent by multiple first user equipments, where the first measurement data includes identification information of the first user equipment, cell identification information and signal power values, measured by the first user equipment, of multiple cells, and feature attribute information of multiple first access nodes that is measured by the first user equipment.

Specifically, a server receives multiple pieces of first measurement data sent by multiple first user equipments. Each piece of first measurement data includes identification information of the first user equipment. As an example rather than a limitation, the identification information of the first user equipment may be specifically international mobile equipment identity (IMEI for short) information of the first user equipment, cell identification information and signal power value, measured by the first user equipment, of multiple cells, and feature attribute information of multiple first access nodes in which the first user equipment is located. As an example rather than a limitation, the cell identification information may be specifically a physical-layer cell code (PCI for short) or a cell global identifier (GCI for short).

In this embodiment of the present invention, currently the first user equipment may be located in multiple cells. For example, the first user equipment is located in a cell A, a cell B, a cell C, and a cell D. The first user equipment may measure a signal power value of the cell A having a relatively strong signal, and may also measure signal power values of the cell B, the cell C, and the cell D having relatively weak signals. The first user equipment adds, to the first measurement data, the measured signal power values of all the cells. Similarly, the first user equipment also adds, to the first measurement data, feature attribute information of multiple first access nodes in which the first user equipment is located.

Further, when measuring the signal power values of the cells, the first user equipment may also obtain cell identification information of each cell.

It may be understood that, because when the first user equipment performs measurement, the signal power values, received by the first user equipment, of the cells in which the first user equipment is located may change with time and location, each first user equipment may send multiple pieces of first measurement data to the server.

The first user equipment involved in this embodiment of the present invention may be specified by the server or set by management service personnel.

In an implementation case, before the server receives the multiple pieces of first measurement data sent by the multiple first user equipments, the server further sends a report measurement data instruction to a small cell (small cell), where the report measurement data instruction includes identification information (for example, IMEI information) of the user equipment specified by the server. The small cell sends, according to the report measurement data instruction, minimization of drive tests (MDT for short) signaling to multiple user equipments that are in a signal coverage range of the small cell and that are specified by the server, where the MDT signaling is used to enable the multiple user equipments to send measurement data to the server.

In another implementation case, the multiple user equipments are set by management service personnel. The multiple user equipments perform measurement autonomously and send measurement data to the server.

In this embodiment of the present invention, the first user equipment specifically refers to a terminal having a wireless receiving and sending function (for example, a WiFi function), and the first user equipment obtains measurement data by using the wireless receiving and sending function of the first user equipment.

The access node specifically refers to an access node in a cell in which the first user equipment is located, that is, a small-power access node. As an example rather than a limitation, the small-power access node includes wireless access nodes such as a Pico base station, a Femto base station, and a WiFi access point.

Step 120: Select, by using the identification information of the first user equipments, multiple pieces of the first measurement data that have identification information of a same first user equipment.

Specifically, the server obtains the identification information of the first user equipment from the first measurement data, and selects, by using the identification information of the first user equipments, multiple pieces of first measurement data having identification information of a same first user equipment.

Further, the having identification information of a same first user equipment specifically refers to first measurement data sent by the same first user equipment.

Step 130: When the first user equipment is located indoors, obtain location information of multiple of the first access nodes according to feature attribute information of the multiple of the first access nodes that is included in the selected multiple pieces of the first measurement data.

Specifically, according to the selection in step 120, when the first user equipment sending the first measurement data having the identification information of the same first user equipment is located indoors, the server obtains location information of multiple of the first access nodes according to feature attribute information of the multiple of the first access nodes included in the selected multiple pieces of the first measurement data.

Further, feature attribute information of the first access node includes identification information of the first access node. As an example rather than a limitation, the identification information of the access node may be specifically a media access control (MAC for short) address of the access node.

The obtaining location information of multiple of the first access nodes according to feature attribute information of the multiple of the first access nodes that is included in the selected multiple pieces of the first measurement data specifically includes:

searching for, by the server according to identification information of the multiple of first access nodes, location information, which matches the identification information of the multiple of the first access nodes, of multiple of second access nodes; and using, by the server, the found location information of the multiple of the second access nodes as the location information of the multiple of the first access nodes.

It may be understood that, location information of multiple second access nodes may be prestored in a database of a server, the server searches the database according to identification information of multiple of first access nodes to determine whether there is location information, which matches the identification information of the multiple of the first access nodes, of multiple of second access nodes. If matched location information of the multiple of the second access nodes is found, the server uses the found location information of the multiple of the second access nodes as the location information of the multiple of the first access nodes.

In this embodiment of the present invention, identification information of at least three first access nodes is selected, and location information of at least three first access nodes is obtained, that is, the server obtains location information of at least three first access nodes according to identification information of the at least three first access nodes.

Figure 2:
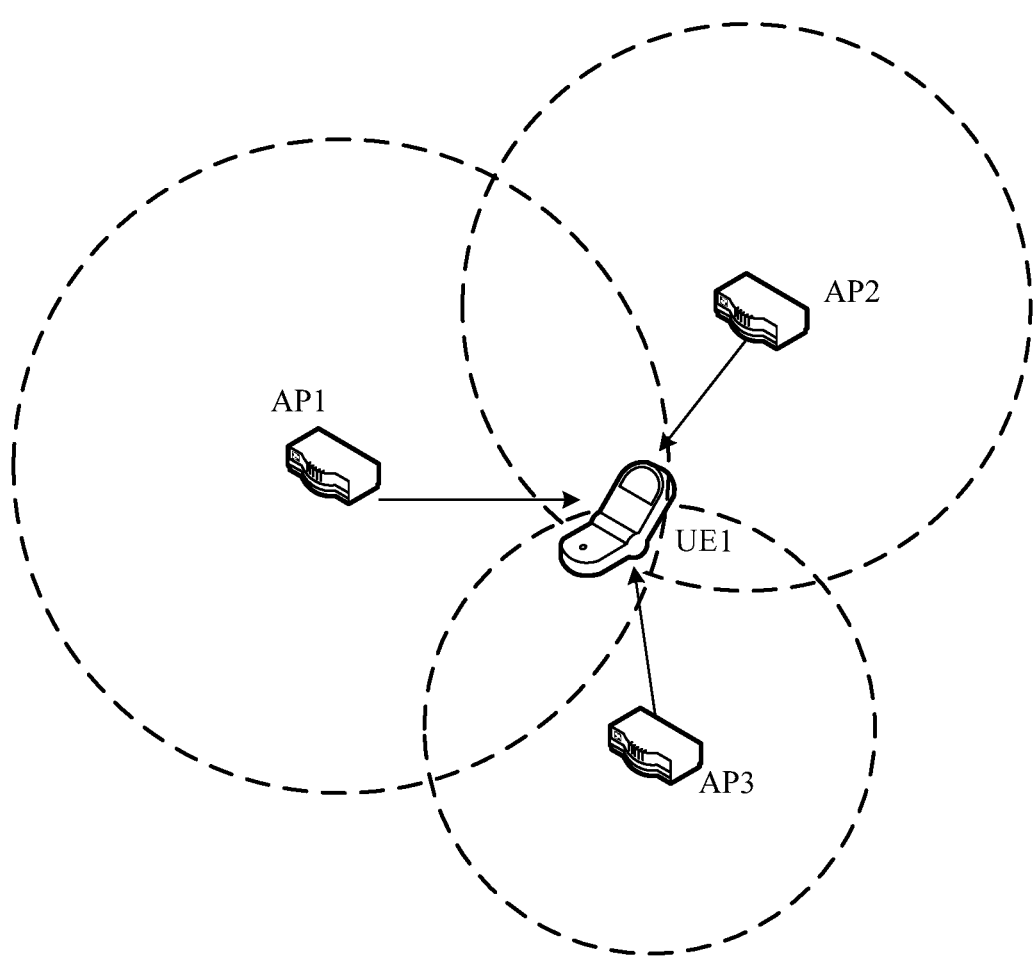
FIG. 2 is a schematic diagram of determining an indoor location of user equipment by a server according to an embodiment of the present invention.

In an example, identification information of three first access nodes is selected. As shown in FIG. 2, according to identification information of MAC addresses of the three first access nodes, the server finds location information, which matches the identification information of the three first access nodes, of three second access nodes from a database, and uses the found location information of the three second access nodes as location information of the three first access nodes. The three second access nodes AP1, AP2, and AP3 are shown in FIG. 2.

S140: Determine, according to the location information of the multiple of the first access nodes and the feature attribute information of the multiple of the first access nodes, indoor location information of the first user equipment when the first user equipment obtains the first measurement data.

Specifically, according to the obtained location information of the multiple of the first access nodes, the server determines indoor location information of the first user equipment when the first user equipment obtains the first measurement data.

Further, the feature attribute information of the first access node further includes a signal power value, received by the first user equipment, of the first access node; and the determining, according to the location information of the multiple of the first access nodes and the feature attribute information of the multiple of the first access nodes, indoor location information of the first user equipment when the first user equipment obtains the first measurement data specifically includes:

determining, by the server according to the location information of the multiple of the first access nodes and signal power values of the multiple of the first access nodes, the indoor location information of the first user equipment.

In an example, there are specifically three pieces of location information of first access nodes. As shown in FIG. 2, the server obtains location information of three first access nodes, and a distance d between each access node and first user equipment (for example, a UE1) is deduced according to the location information of the three first access nodes and signal power values of the three first access nodes and by using an empirical path propagation loss formula. Three circles are obtained with a location of each access node as the center of a circle and the distance d as a radius, and an intersection point of the three circles is an indoor location of the first user equipment. Location information of the intersection point is indoor location information of the first user equipment.

As an example rather than a limitation, the path propagation loss formula is specifically implemented by using Formula (1):

$$PL=A+B*\log(d) \quad \text{Formula (1)}$$

where PL represents a path loss, d represents a distance between an access node and user equipment, A represents an intercept, B represents a propagation loss index, and A and B are both related to a physical environment.

It may be understood that, when the server obtains location information of more first access nodes, location information of an intersection point of multiple circles is indoor location information of the first user equipment. A specific process is the same as the above description, and details are not described herein again.

It should be noted that, besides identification information of an access node involved in step 130 and signal power values involved in step 140, where the signal power values of multiple access nodes in which the first user equipment is located are received by the first user equipment, in actual application, feature attribute information of an access node may further selectively include one or a combination of a measurement time, a service set identifier (SSID for short) of the access node, a type of the access node, or a broadcast channel number of the access node.

Step 150: Establish an indoor location feature library by using multiple pieces of the cell identification information and multiple of the signal power values and the indoor location information of the first user equipment.

Specifically, after determining the indoor location information of the first user equipment, the server establishes an indoor location feature library by using multiple pieces of cell identification information and multiple of signal power values and the indoor location information of the first user equipment, so that when receiving measurement data sent by user equipment at an unknown location, the server determines a location of the user equipment at the unknown location according to the indoor location feature library or an outdoor location feature library.

Further, the indoor location feature library established by the server is specifically shown in Table 1.

TABLE 1

Indoor Location Feature Library

| Indoor location information | Feature list of signal power values |
|---|---|
| Location 1 (x1, y1) | Cell 1: XXX1 ± A1%, cell 2: XXX2 ± A2%, cell 3: XXX3 ± A3%, . . . |
| Location 2 (x2, y2) | Cell 4: YYY2 ± B2%, cell 2: YYY2 ± B2%, cell 5: YYY3 ± B3%, . . . |
| . . . | . . . |

It may be understood that, in actual networking, each cell has an overlapped part, and therefore, in Table 1, one indoor location may correspond to signal power values of multiple cells.

It should be noted that, the outdoor location feature library may be established according to the prior art, and details are not described herein again. The established outdoor location feature library may be stored in a database of the server.

In this embodiment of the present invention, when receiving new first measurement data, the server may further update the established indoor location feature library according to the foregoing step 110 to step 150.

Optionally, in this embodiment of the present invention, before step 110, the method further includes a step of receiving, by the server, multiple pieces of second measurement data sent by multiple second user equipments; determining, according to the multiple pieces of second measurement data, location information of multiple of second access nodes in which the second user equipment is located; and storing the location information of the multiple of the second access nodes. By means of the step, in step 130, the server searches the database according to the identification information of the multiple first access nodes to determine whether there is location information, which matches the identification information of the multiple first access nodes, of the multiple of the second access nodes; and if the server finds matched location information of the multiple of the second access nodes, and uses the found location information of the multiple of the second access nodes as location information of the multiple first access nodes. Specific steps are as follows:

receiving multiple pieces of second measurement data sent by multiple second user equipments, where the second measurement data includes location information of the second user equipment when the second user equipment obtains the second measurement data and feature attribute information of multiple second access nodes that is measured by the second user equipment, and the feature attribute information of the second access node includes identification information of the second access node and a signal power value, measured by the second user equipment, of the second access node;

selecting multiple pieces of the second measurement data that have identification information of a same second access node;

determining location information of multiple of the second access nodes according to location information of multiple of the second user equipments and signal power values of the multiple of the second access nodes; and storing the determined location information of the multiple of the second access nodes.

Specifically, the server receives multiple pieces of second measurement data sent by multiple second user equipments, where each piece of second measurement data includes location information of the second user equipment when the second user equipment obtains the second measurement data and feature attribute information of multiple second access nodes that is measured by the second user equipment, and the feature attribute information of the second access node includes identification information of the second access node and a signal power value, measured by the second user equipment, of the second access node. As an example rather than a limitation, the identification information of the access node may be specifically a MAC address of the access node.

It may be understood that, because when the second user equipment performs measurement, a signal power value, which is received by the second user equipment, of a cell in which the second user equipment is located may change with time and location, each second user equipment may send multiple pieces of second measurement data to the server.

The second user equipment involved in this embodiment of the present invention may be specified by the server or set by management service personnel. A process of specifying the second user equipment by the server or setting the second user equipment by the management service personnel is the same as the process of specifying the first user equipment by the server or setting the first user equipment by the management service personnel in the foregoing step 110, and details are not described herein again.

The server selects multiple pieces of second measurement data having identification information of a same second access node by using identification information of the second access nodes. In this embodiment of the present invention, at least three pieces of second measurement data are selected by the server.

The server determines location information of multiple second access nodes according to location information of multiple second user equipments and signal power values of the multiple second access nodes.

Figure 3:
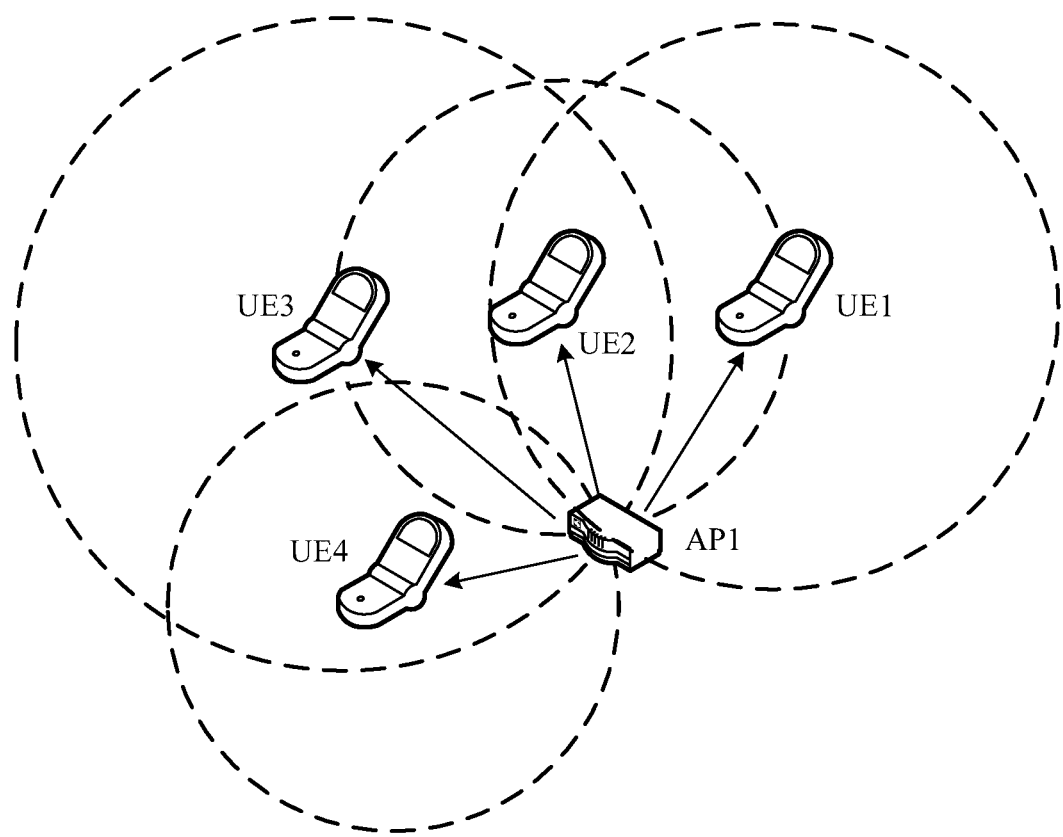
FIG. 3 is a schematic diagram of determining a location of an access node by a server according to an embodiment of the present invention.

In an example, the server selects four pieces of second measurement data and determines location information of an access node according to the selected four pieces of second measurement data. As shown in FIG. 3, the server selects four pieces of second measurement data, separately obtains location information of four second user equipments and signal power values of four second access nodes from the four pieces of second measurement data, and deduces a distance d between each second user equipment and a second access node (for example, AP1) according to the location information of the four second user equipments (for example, the UE1, a UE2, a UE3, and a UE4 in FIG. 3) and the signal power values of the four second access nodes and by using an empirical path propagation loss formula. That is, four circles are obtained with location information of each second user equipment as the center of a circle and the distance d as a radius, and an intersection point of the four circles is a location of the second access node. Location information of the intersection point is location information of the second access node.

As an example rather than a limitation, the path propagation loss formula is specifically implemented by using Formula (1):

$$PL = A + B * \log(d) \qquad \text{Formula (1)}$$

where PL represents a path loss, d represents a distance between an access node and user equipment, A represents an intercept, B represents a propagation loss index, and A and B are both related to a physical environment.

It may be understood that, when the server obtains location information of more second user equipments, location information of an intersection point of multiple circles is location information of a second access node. A specific process is the same as the above description, and details are not described herein again.

The server stores the determined location information of the multiple of the second access nodes, for example, may store the location information of the multiple second access nodes in a database of the server.

It should be noted that, the server may store the location information of the multiple second access nodes according to the foregoing steps, and details are not described herein again. When receiving new second measurement data, the server may further update the determined location information of the second access nodes according to the foregoing steps.

In this embodiment of the present invention, because second measurement data sent by second user equipment includes location information of the second user equipment when the second user equipment obtains second measurement data, the server determines the second user equipment as outdoor user equipment, and the location information of the second user equipment may be further used to establish an outdoor location feature library.

Optionally, in this embodiment of the present invention, after step 120, the method further includes a step of determining, by the server, whether the first user equipment is located indoors when the first user equipment sends the first measurement data. When the first user equipment is located indoors, the server continues to perform a subsequent step, so as to further establish an indoor location feature library. Specific steps are as follows:

when the first user equipment sending the first measurement data having the identification information of a same first user equipment is handed over between cells within a preset time, determining that the first user equipment is located indoors when the first user equipment sends the multiple pieces of first measurement data; and if the first user equipment is located indoors, obtaining location information of multiple of the first access nodes according to feature attribute information of the multiple of the first access nodes that is included in the selected multiple pieces of the first measurement data.

Specifically, the server monitors, within the preset time, a behavior of the first user equipment sending the first measurement data that have the identification information of the same first user equipment. The behavior specifically refers to a behavior of a handover of the first user equipment between cells. When the first user equipment sending the first measurement data having the identification information of the same first user equipment is handed over between cells, the server determines whether the first user equipment is located indoors when the first user equipment sends multiple pieces of first measurement data.

If the first user equipment is located indoors, the server performs step 130, that is, obtains location information of the multiple first access nodes according to feature attribute information of the multiple first access nodes that is included in the selected multiple pieces of the first measurement data.

If the first user equipment is located outdoors, the server does not perform a subsequent step any more, determines that the first measurement data sent by the first user equipment is not suitable to be used to establish an indoor location feature library, and instead uses the first measurement data sent by the first user equipment to update an outdoor location feature library.

Optionally, in this embodiment of the present invention, after step 150, the method further includes steps of receiving, by the server, third measurement data sent by third user equipment, and determining a location of the third user equipment according to the established indoor location feature library or an outdoor location feature library. Specific steps are as follows:

receiving third measurement data sent by third user equipment, where the third measurement data includes identification information of the third user equipment and cell identification information and signal power values, measured by the third user equipment, of multiple cells;

determining, by using the identification information of the third user equipment, whether the third user equipment is located indoors when the third user equipment obtains the third measurement data;

if the third user equipment is located indoors, determining an indoor location of the third user equipment according to the indoor location feature library and multiple pieces of the cell identification information and multiple of the signal power values; and if the third user equipment is located outdoors, determining an outdoor location of the third user equipment according to an outdoor location feature library and multiple pieces of the cell identification information and multiple of the signal power values.

Specifically, the server receives third measurement data sent by third user equipment, where the third measurement data includes identification information of the third user equipment and cell identification information and signal power values, measured by the third user equipment, of multiple cells.

The server determines, by using the identification information of the third user equipment, whether the third user equipment is located indoors when the third user equipment obtains the third measurement data. In this embodiment of the present invention, within a preset time, the server monitors a behavior of the third user equipment. The behavior specifically refers to a behavior of a handover of the third user equipment between cells. When the third user equipment is handed over between cells, the server determines whether the third user equipment is located indoors when the third user equipment obtains the third measurement data;

if the third user equipment is located indoors, the server determines an indoor location of the third user equipment according to the indoor location feature library and multiple pieces of the cell identification information and multiple of the signal power values; and if the third user equipment is located outdoors, the server determines an outdoor location of the third user equipment according to an outdoor location feature library and multiple pieces of the cell identification information and multiple of the signal power values.

Therefore, according to the method for establishing an indoor location feature library provided in this embodiment of the present invention, a server selects multiple pieces of first measurement data, which have identification information of a same first user equipment, from received multiple pieces of first measurement data; when the first user equipment is located indoors, obtains, by using the selected multiple pieces of the first measurement data, location information of multiple first access nodes in which the first user equipment is located; and determines indoor location information of the first user equipment according to the location information of the multiple first access nodes, and establishes an indoor location feature library. The method and apparatus resolve of great difficulty in constructing an indoor location feature library in an existing RF fingerprint location technology as well as low location precision and an undesirable indoor location effect of the constructed indoor location feature library because a GNSS function cannot perform accurate location measurement indoors and a network side generally determines an indoor location of a UE by using only a handover of the UE between cells; and establish an indoor location feature library by the server according to measurement data, and improve precision of establishing an indoor location feature library. In addition, during subsequent location, the server selectively uses outdoor and indoor location feature libraries according to measurement data sent by user equipment, which also improves a location effect for an entire area.

Embodiment 2

Figure 4:
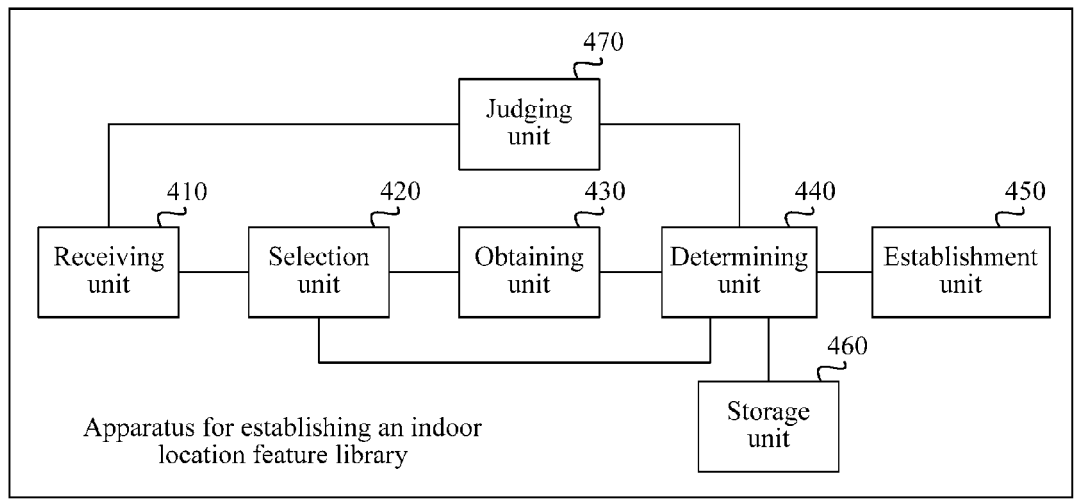
FIG. 4 is a schematic structural diagram of an apparatus for establishing an indoor location feature library according to Embodiment 2 of the present invention.

Correspondingly, an embodiment of the present invention further provides an apparatus for establishing an indoor location feature library. An implementation structure of the apparatus for establishing an indoor location feature library is shown in FIG. 4, and the apparatus for establishing an indoor location feature library is configured to perform the method for establishing an indoor location feature library in Embodiment 1 of the present invention. The apparatus includes the following units: a receiving unit 410, a selection unit 420, an obtaining unit 430, a determining unit 440, and an establishment unit 450.

The receiving unit 410 in the apparatus is configured to receive multiple pieces of first measurement data sent by multiple first user equipments, where the first measurement data includes identification information of the first user equipment, cell identification information and signal power values, measured by the first user equipment, of multiple cells, and feature attribute information of multiple first access nodes that is measured by the first user equipment.

The selection unit 420 is configured to select, by using the identification information of the first user equipments, multiple pieces of the first measurement data that have identification information of a same first user equipment.

The obtaining unit 430 is configured to: when the first user equipment is located indoors, obtain location information of multiple of the first access nodes according to feature attribute information of the multiple of the first access nodes that is included in the selected multiple pieces of the first measurement data.

The determining unit 440 is configured to determine, according to the location information of the multiple of the first access nodes and the feature attribute information of the multiple of the first access nodes, indoor location information of the first user equipment when the first user equipment obtains the first measurement data.

The establishment unit 450 is configured to establish an indoor location feature library by using multiple pieces of the cell identification information and multiple of the signal power values and the indoor location information of the first user equipment.

The receiving unit 410 is further configured to receive multiple pieces of second measurement data sent by multiple second user equipments, where the second measurement data includes location information of the second user equipment when the second user equipment obtains the second measurement data and feature attribute information of multiple second access nodes that is measured by the second user equipment, and the feature attribute information of the second access node includes identification information of the second access node and a signal power value, measured by the second user equipment, of the second access node.

The selection unit 420 is further configured to select multiple pieces of the second measurement data that have identification information of a same second access node.

The determining unit 440 is further configured to determine location information of multiple of the second access nodes according to location information of multiple of the second user equipments and signal power values of the multiple of the second access nodes.

The apparatus further includes a storage unit 460, configured to store the determined location information of the multiple of the second access nodes.

The feature attribute information of the first access node that is received by the receiving unit 410 includes identification information of the first access node; and the obtaining unit 430 is specifically configured to search for, according to identification information of the multiple of the first access nodes, location information, which matches the identification information of the multiple of the first access nodes, of the multiple of the second access nodes; and use the found location information of the multiple of the second access nodes as the location information of the multiple of the first access nodes.

The feature attribute information of the first access node that is received by the receiving unit 410 further includes a signal power value, measured by the first user equipment, of the first access node; and the determining unit 440 is specifically configured to determine, according to the location information of the multiple of the first access nodes and signal power values of the multiple of the first access nodes, the indoor location information of the first user equipment when the first user equipment obtains the first measurement data.

The receiving unit 410 is further configured to receive third measurement data sent by third user equipment, where the third measurement data includes identification information of the third user equipment and cell identification information and signal power values, measured by the third user equipment, of multiple cells.

The apparatus further includes a judging unit 470, configured to determine, by using the identification information of the third user equipment, whether the third user equipment is located indoors when the third user equipment obtains the third measurement data.

The determining unit 440 is further configured to: if the third user equipment is located indoors, determine an indoor location of the third user equipment according to the indoor location feature library and multiple pieces of the cell identification information and multiple of the signal power values.

The determining unit 440 is further configured to: if the third user equipment is located outdoors, determine an outdoor location of the third user equipment according to an outdoor location feature library and multiple pieces of the cell identification information and multiple of the signal power values.

Therefore, according to the apparatus for establishing an indoor location feature library provided in this embodiment of the present invention, the apparatus selects multiple pieces of first measurement data, which have identification information of a same first user equipment, from received multiple pieces of first measurement data; when the first user equipment is located indoors, obtains, by using the selected multiple pieces of the first measurement data, location information of multiple first access nodes in which the first user equipment is located; and determines indoor location information of the first user equipment according to the location information of the multiple first access nodes, and establishes an indoor location feature library. The method and apparatus resolve of great difficulty in constructing an indoor location feature library in an existing RF fingerprint location technology as well as low location precision and an undesirable indoor location effect of the constructed indoor location feature library because a GNSS function cannot perform accurate location measurement indoors and a network side generally determines an indoor location of a UE by using only a handover of the UE between cells; and establish an indoor location feature library by the apparatus according to measurement data, and improve precision of establishing an indoor location feature library. In addition, during subsequent location, the server selectively uses outdoor and indoor location feature libraries according to measurement data sent by user equipment, which also improves a location effect for an entire area.

Embodiment 3

Figure 5:
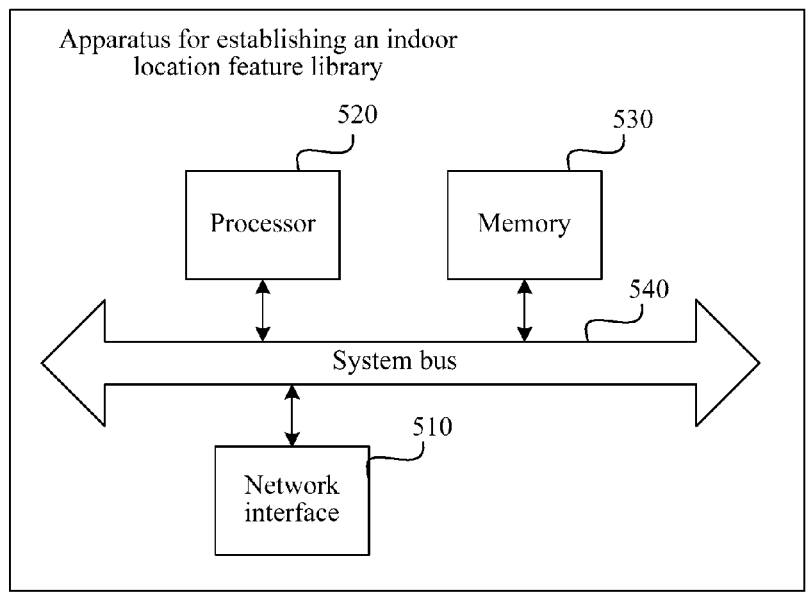
FIG. 5 is a schematic structural diagram of hardware of an apparatus for establishing an indoor location feature library according to Embodiment 3 of the present invention.

In addition, the apparatus for establishing an indoor location feature library provided in Embodiment 2 of the present invention may further use the following implementation manner to implement the method for establishing an indoor location feature library in Embodiment 1 of the present invention. As shown in FIG. 5, an apparatus for establishing an indoor location feature library includes: a network interface 510, a processor 520, and a storage 530. A system bus 540 is used to connect the network interface 510, the processor 520, and the storage 530.

The network interface 510 is configured to interact and communicate with user equipment and a small cell.

The storage 530 may be a permanent memory, for example, a hard disk drive and a flash memory. The storage 530 is configured to store an application program, and the application program includes the following instructions for the processor 520 to access and execute:

receiving multiple pieces of first measurement data sent by multiple first user equipments, where the first measurement data includes identification information of the first user equipment, cell identification information and signal power values, measured by the first user equipment, of multiple cells, and feature attribute information of multiple first access nodes that is measured by the first user equipment;

selecting, by using the identification information of the first user equipments, multiple pieces of the first measurement data that have identification information of a same first user equipment;

when the first user equipment is located indoors, obtaining location information of multiple of the first access nodes according to feature attribute information of the multiple of the first access nodes that is included in the selected multiple pieces of the first measurement data;

determining, according to the location information of the multiple of the first access nodes and the feature attribute information of the multiple of the first access nodes, indoor location information of the first user equipment when the first user equipment obtains the first measurement data; and establishing an indoor location feature library by using multiple pieces of the cell identification information and multiple of the signal power values and the indoor location information of the first user equipment.

Further, the application program further includes an instruction that can be used to enable the processor 520 to execute the following processes:

receiving multiple pieces of second measurement data sent by multiple second user equipments, where the second measurement data includes location information of the second user equipment when the second user equipment obtains the second measurement data and feature attribute information of multiple second access nodes that is measured by the second user equipment, and the feature attribute information of the second access node includes identification information of the second access node and a signal power value, measured by the second user equipment, of the second access node;

selecting multiple pieces of the second measurement data that have identification information of a same second access node;

determining location information of multiple of the second access nodes according to location information of multiple of the second user equipments and signal power values of the multiple of the second access nodes; and storing the determined location information of the multiple of the second access nodes.

Further, the feature attribute information of the first access node includes identification information of the first access node; and an instruction, which can be used to enable the processor 520 to execute the process of obtaining location information of multiple of the first access nodes according to feature attribute information of the multiple of the first access nodes that is included in the selected multiple pieces of the first measurement data, of the application program is:

searching for, according to identification information of the multiple of the first access nodes, location information, which matches the identification information of the multiple of the first access nodes, of the multiple of the second access nodes; and using the found location information of the multiple of the second access nodes as the location information of the multiple of the first access nodes.

Further, the feature attribute information of the first access node further includes a signal power value, measured by the first user equipment, of the first access node; and an instruction, which can be used to enable the processor 520 to execute the process of determining, according to the location information of the multiple of the first access nodes and the feature attribute information of the multiple of the first access nodes, indoor location information of the first user equipment when the first user equipment obtains the first measurement data, of the application program is:

determining, according to the location information of the multiple of the first access nodes and signal power values of the multiple of the first access nodes, the indoor location information of the first user equipment when the first user equipment obtains the first measurement data.

The application program further includes an instruction that can be used to enable the processor 520 to execute the following processes:

receiving third measurement data sent by third user equipment, where the third measurement data includes identification information of the third user equipment and cell identification information and signal power values, measured by the third user equipment, of multiple cells;

determining, by using the identification information of the third user equipment, whether the third user equipment is located indoors when the third user equipment obtains the third measurement data;

if the third user equipment is located indoors, determining an indoor location of the third user equipment according to the indoor location feature library and multiple pieces of the cell identification information and multiple of the signal power values; and if the third user equipment is located outdoors, determining an outdoor location of the third user equipment according to an outdoor location feature library and multiple pieces of the cell identification information and multiple of the signal power values.

Therefore, according to the apparatus for establishing an indoor location feature library provided in this embodiment of the present invention, the apparatus selects multiple pieces of first measurement data, which have identification information of a same first user equipment, from received multiple pieces of first measurement data; when the first user equipment is located indoors, obtains, by using the selected multiple pieces of the first measurement data, location information of multiple first access nodes in which the first user equipment is located; and determines indoor location information of the first user equipment according to the location information of the multiple first access nodes, and establishes an indoor location feature library. The method and apparatus resolve of great difficulty in constructing an indoor location feature library in an existing RF fingerprint location technology as well as low location precision and an undesirable indoor location effect of the constructed indoor location feature library because a GNSS function cannot perform accurate location measurement indoors and a network side generally determines an indoor location of a UE by using only a handover of the UE between cells; and establish an indoor location feature library by the apparatus according to measurement data, and improve precision of establishing an indoor location feature library. In addition, during subsequent location, the server selectively uses outdoor and indoor location feature libraries according to measurement data sent by user equipment, which also improves a location effect for an entire area.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for establishing an indoor location feature library, comprising:
receiving, by a server, multiple pieces of first measurement data sent by multiple first user equipments, wherein each first measurement data comprises identification information of one of the multiple first user equipments, cell identification information and signal power values, measured by the one of the multiple first user equipments, of multiple cells, and feature attribute information of a plurality of first access nodes that is measured by the one of the multiple first user equipments;

selecting, by the server, using the identification information of the multiple first user equipments, multiple pieces of the first measurement data that have identification information of a same first user equipment;

when the same first user equipment is located indoors, obtaining, by the server, location information of multiple of the first access nodes according to feature attribute information of the multiple of the first access nodes that is comprised in the selected multiple pieces of the first measurement data;

determining, by the server, according to the location information of the multiple of the first access nodes and the feature attribute information of the multiple of the first access nodes, indoor location information of the same first user equipment when the same first user equipment obtains the first measurement data; and establishing, by the server, an indoor location feature library using multiple pieces of the cell identification information and multiple of the signal power values and the indoor location information of the same first user equipment.

2. The method for establishing an indoor location feature library according to claim 1, before the receiving, by the server, multiple pieces of first measurement data sent by multiple first user equipments, further comprising:

receiving multiple pieces of second measurement data sent by multiple second user equipments, wherein each second measurement data comprises location information of one of the multiple second user equipments when the one of the multiple second user equipments obtains the second measurement data and feature attribute information of a plurality of second access nodes that is measured by the one of the multiple second user equipments, and the feature attribute information of each second access node comprises identification information of the second access node and a signal power value, measured by the one of the multiple second user equipments, of the second access node;

selecting multiple pieces of the second measurement data that have identification information of a same second access node;

determining location information of multiple of the second access nodes according to location information of multiple of the second user equipments and signal power values of the multiple of the second access nodes; and storing the determined location information of the multiple of the second access nodes.

3. The method for establishing an indoor location feature library according to claim 2, wherein the feature attribute information of each first access node comprises identification information of the first access node; and the obtaining, by the server, location information of multiple of the first access nodes according to feature attribute information of the multiple of the first access nodes that is comprised in the selected multiple pieces of the first measurement data comprises:

searching for, according to identification information of the multiple of the first access nodes, location information, which matches the identification information of the multiple of the first access nodes, of the multiple of the second access nodes; and using the found location information of the multiple of the second access nodes as the location information of the multiple of the first access nodes.

4. The method for establishing an indoor location feature library according to claim 3, wherein the feature attribute information of each first access node further comprises a signal power value, measured by the one of the multiple first user equipments, of the first access node; and the determining, by the server, according to the location information of the multiple of the first access nodes and the feature attribute information of the multiple of the first access nodes, indoor location information of the same first user equipment when the same first user equipment obtains the first measurement data comprises:

determining, according to the location information of the multiple of the first access nodes and signal power values of the multiple of the first access nodes, the indoor location information of the same first user equipment when the same first user equipment obtains the first measurement data.

5. The method for establishing an indoor location feature library according to claim 1, after the establishing, by the server, an indoor location feature library using multiple pieces of the cell identification information and multiple of the signal power values and the indoor location information of the same first user equipment, further comprising:

receiving third measurement data sent by a third user equipment, wherein the third measurement data comprises identification information of the third user equipment and cell identification information and signal power values, measured by the third user equipment, of multiple cells;

determining, using the identification information of the third user equipment, whether the third user equipment is located indoors when the third user equipment obtains the third measurement data;

if the third user equipment is located indoors, determining an indoor location of the third user equipment according to the indoor location feature library and multiple pieces of the cell identification information and multiple of the signal power values; and if the third user equipment is located outdoors, determining an outdoor location of the third user equipment according to an outdoor location feature library and multiple pieces of the cell identification information and multiple of the signal power values.

6. An apparatus, comprising a processor and a memory:

the memory is configured to store an application program, and the application program includes the following instructions for the processor to access and execute:

receiving multiple pieces of first measurement data sent by multiple first user equipments, wherein each first measurement data comprises identification information of one of the multiple first user equipments, cell identification information and signal power values, measured by the one of the multiple first user equipments, of multiple cells, and feature attribute information of a plurality of first access nodes that is measured by the one of the multiple first user equipments;

selecting, using the identification information of the multiple first user equipments, multiple pieces of the first measurement data that have identification information of a same first user equipment;

when the same first user equipment is located indoors, obtaining location information of multiple of the first access nodes according to feature attribute information of the multiple of the first access nodes that is comprised in the selected multiple pieces of the first measurement data;

determining, according to the location information of the multiple of the first access nodes and the feature attribute information of the multiple of the first access nodes, indoor location information of the same first user equipment when the same first user equipment obtains the first measurement data; and establishing an indoor location feature library using multiple pieces of the cell identification information and multiple of the signal power values and the indoor location information of the same first user equipment.

7. The apparatus according to claim 6, wherein the application program further includes an instruction that is used to enable the processor to execute the following processes:

receiving multiple pieces of second measurement data sent by multiple second user equipments, wherein each second measurement data comprises location information of one of the multiple second user equipments when the second user equipment obtains the second measurement data and feature attribute information of a plurality of second access nodes that is measured by the one of the multiple second user equipments, and the feature attribute information of each second access node comprises identification information of the second access node and a signal power value, measured by the one of the multiple second user equipments, of the second access node;

selecting multiple pieces of the second measurement data that have identification information of a same second access node; and determining location information of multiple of the second access nodes according to location information of multiple of the second user equipments and signal power values of the multiple of the second access nodes; and storing the determined location information of the multiple of the second access nodes.

8. The apparatus according to claim 7, wherein the received feature attribute information of each first access node comprises identification information of the first access node; and the instruction, which is used to enable the processor to execute the process of obtaining location information of multiple of the first access nodes according to feature attribute information of the multiple of the first access nodes that is included in the selected multiple pieces of the first measurement data, of the application program enables the processor to execute:

searching for, according to identification information of the multiple of the first access nodes, location information, which matches the identification information of the multiple of the first access nodes, of the multiple of the second access nodes; and using the found location information of the multiple of the second access nodes as the location information of the multiple of the first access nodes.

9. The apparatus for establishing an indoor location feature library according to claim 8, wherein the received feature attribute information of each first access node comprises a signal power value, measured by the one of the multiple first user equipments, of the first access node; and an instruction, which is used to enable the processor to execute the process of determining, according to the location information of the multiple of the first access nodes and the feature attribute information of the multiple of the first access nodes, indoor location information of the same first user equipment when the same first user equipment obtains the first measurement data, of the application program enables the processor to execute:

determining, according to the location information of the multiple of the first access nodes and signal power values of the multiple of the first access nodes, the indoor location information of the same first user equipment when the same first user equipment obtains the first measurement data.

10. The apparatus according to claim 6, wherein the application program further includes an instruction that is used to enable the processor to execute the following processes:

receiving third measurement data sent by a third user equipment, wherein the third measurement data comprises identification information of the third user equipment and cell identification information and signal power values, measured by the third user equipment, of multiple cells; and determining, using the identification information of the third user equipment, whether the third user equipment is located indoors when the third user equipment obtains the third measurement data; and if the third user equipment is located indoors, determining an indoor location of the third user equipment according to the indoor location feature library and multiple pieces of the cell identification information and multiple of the signal power values; and if the third user equipment is located outdoors, determining an outdoor location of the third user equipment according to an outdoor location feature library and multiple pieces of the cell identification information and multiple of the signal power values.

* * * * *